(12) United States Patent
Joshi

(10) Patent No.: US 6,560,531 B1
(45) Date of Patent: May 6, 2003

(54) MULTI-RESOLUTION TREND METRIC FOR SHAPE COMPARISON AND APPLICATIONS THEREOF

(75) Inventor: Rajashri Joshi, Schaumburg, IL (US)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 09/862,378

(22) Filed: May 22, 2001

(51) Int. Cl.[7] .................. G06F 15/50; G06F 165/00; G08G 1/123
(52) U.S. Cl. .................. 701/208; 701/213; 340/990; 340/988
(58) Field of Search .................. 701/213, 208, 701/201, 205, 207, 209, 200, 210; 340/990, 995, 988; 73/178 R

(56) References Cited

U.S. PATENT DOCUMENTS

| | | | | |
|---|---|---|---|---|
| 4,963,864 A | * | 10/1990 | Iihoshi et al. | 340/995 |
| 4,970,652 A | | 11/1990 | Nagashima | 701/208 |
| 5,016,007 A | * | 5/1991 | Iihoshi et al. | 340/995 |
| 5,283,575 A | * | 2/1994 | Kao et al. | 340/990 |
| 5,311,173 A | * | 5/1994 | Komura et al. | 340/995 |
| 5,422,815 A | * | 6/1995 | Hijikata | 364/449 |
| 5,774,824 A | * | 6/1998 | Streit et al. | 701/207 |
| 6,002,981 A | * | 12/1999 | Kreft | 701/210 |
| 6,023,653 A | * | 2/2000 | Ichimura et al. | 701/208 |
| 6,192,312 B1 | | 2/2001 | Hummelsheim | 701/118 |
| 6,346,942 B1 | * | 2/2002 | Endo et al. | 345/427 |
| 6,385,539 B1 | * | 5/2002 | Wilson et al. | 701/213 |

\* cited by examiner

*Primary Examiner*—Tan Q. Nguyen
*Assistant Examiner*—Dalena Tran
(74) *Attorney, Agent, or Firm*—Jon D. Shutter; Frank J. Kozak; Lawrence M. Kaplan

(57) ABSTRACT

A method for comparing geometric shapes to each other is disclosed. When used for vehicle positioning, the present method determines which map path of several candidate map paths best matches an actual path traveled by the vehicle as measured by sensors. The vehicle path and each candidate map path are generalized to a given degree of generalization, thereby yielding an overall trend of the vehicle path and overall trends of each of the candidate map paths. The trend of the vehicle path is compared to the trend of each of the candidate map paths. Based on these comparisons, one or more candidate map paths may be eliminated. If more than one map path remains, the vehicle path and each of the remaining map paths are generalized again, this time to a lesser degree of generalization, and comparisons are made between the trend of the vehicle path and the trend of each of the remaining map paths. Based on these comparisons, one or more map paths may be eliminated. These steps are repeated until only a single map path remains. The vehicle is determined to be located on the road represented by the remaining map path. The multi-resolution trend metric concept can be applied to valuation of the accuracy of a geographic database. A generalized version of a sampled geographic feature is compared to one or more generalized versions of ground truth of the feature to determine how well the generalized versions match and how the shape error between the sampled and ground truth segments varies as a function of resolution.

21 Claims, 7 Drawing Sheets

Low Resolution (high tolerance)

High Resolution (low tolerance)

Medium resolution (medium tolerance)

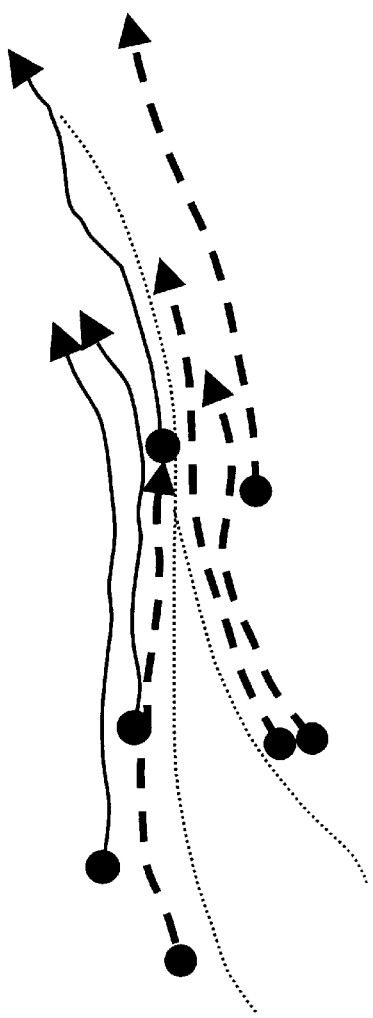
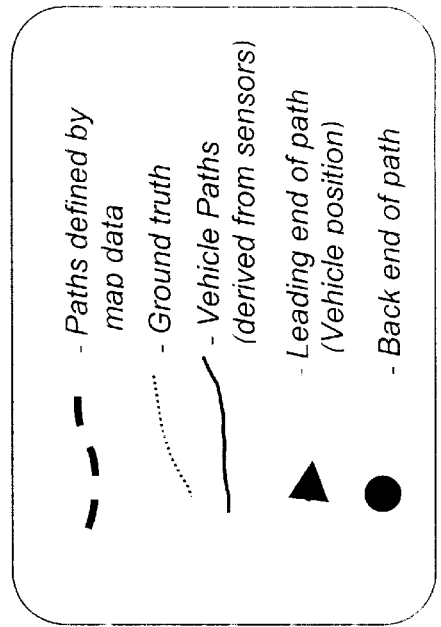
FIG. 5

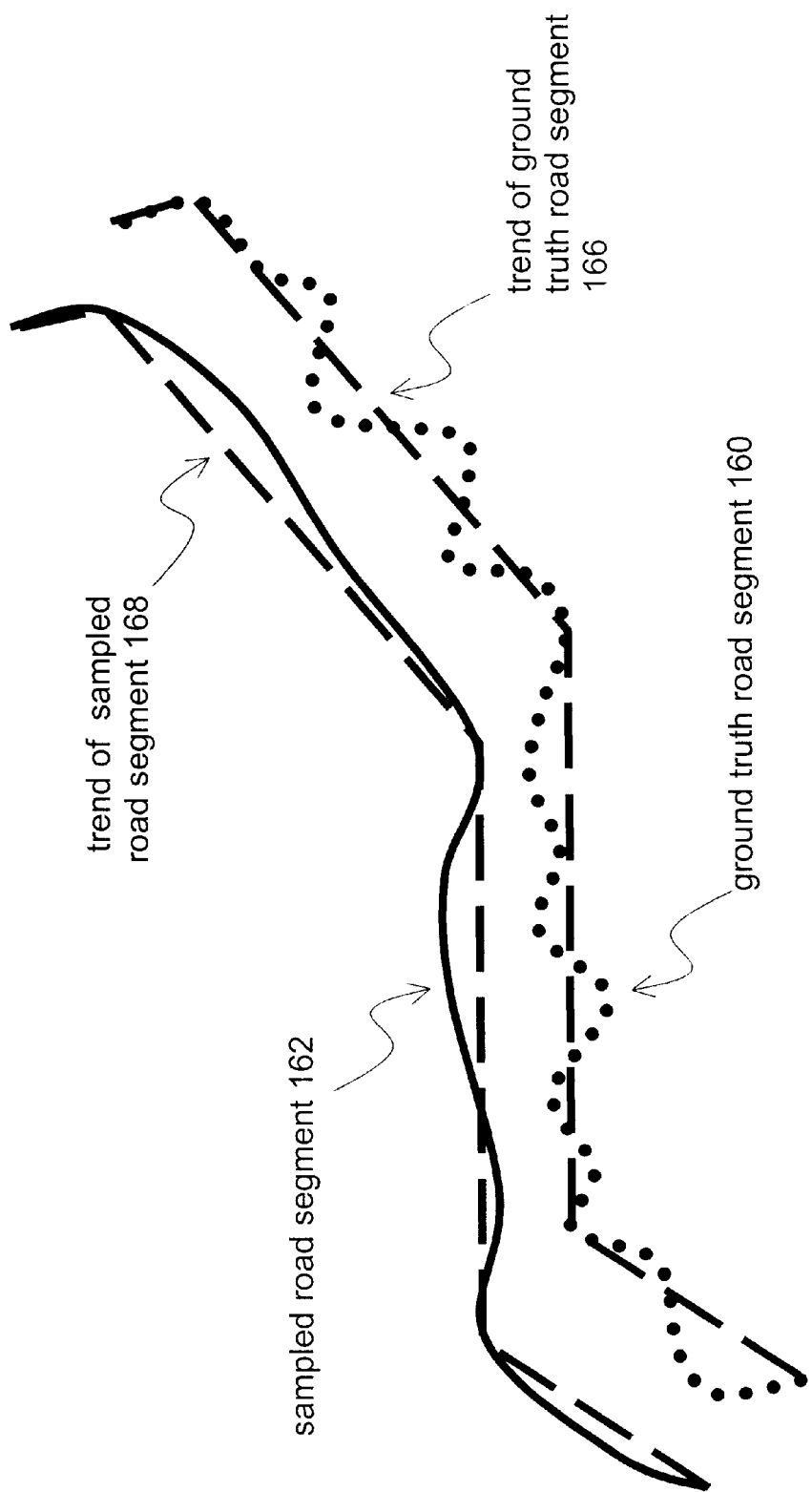

High Resolution

Medium Resolution

Low Resolution

MULTI-RESOLUTION TREND METRIC FOR SHAPE COMPARISON AND APPLICATIONS THEREOF

BACKGROUND OF THE INVENTION

The present invention relates to a method for comparing geometric shapes to each other. One application of the present invention relates to a method for determining a position of a vehicle with respect to a road network. Another application of the present invention relates to a way to measure the relative accuracy of a data representation of a geographic feature.

The need to compare geometric shapes arises in various applications relating to the use of data representations of geographic features. Included among these applications are vehicle positioning (e.g., in navigation systems) and the measurement of geographic database accuracy. For instance, in a vehicle positioning application, one way to determine the position of a vehicle traveling along a road network is to find the best match between the historical vehicular path (as determined by processing data from sensors, such as GPS, inertial sensors, etc.) and the roads that form the road network upon which the vehicle is traveling (as represented by map data contained in a database that represents the road network). A conventional approach to vehicle positioning is to directly compare the shape of the historical vehicular path to each of a plurality of candidate map paths and then select that map path whose shape most closely resembles the vehicular path as the one on which the vehicle is located. The comparison can be accomplished using any of a number of pattern recognition techniques, such as cross-correlation. Generally, this approach provides satisfactory results. However, the comparison of one geometric shape to another can be computationally intensive. If the number of candidate map paths is relatively large, the determination of which candidate map path best matches the historical vehicular path can take a relatively long time. Accordingly, there exists a need for a way to determine a vehicle position with respect to the data representation of a road network that is less computationally intensive than prior approaches.

Another application that uses the comparison of geometric shapes is measurement of geographic database accuracy. A data representation of a geographic feature is called a sampled representation. A sampled representation of a geographic feature, such as a road, is accurate if it closely resembles ground truth. There exists a need for a way to compare a sampled data representation of a geographic feature to ground truth and to measure and quantify the accuracy (or equivalently, error) of the sampled representation.

SUMMARY OF THE INVENTION

To address these and other objectives, the present invention provides a method for comparing geometric shapes to each other. The method is referred to herein as the multi-resolution trend metric. The multi-resolution trend metric method can be used in various applications that require determining which one of several geometric shapes most closely resembles another geometric shape, or how closely two geographic shapes resemble each other.

One application in which the multi-resolution trend metric method can be used is vehicle positioning. When used for vehicle positioning, the method is a tool for determining which map path (i.e., which data representation of a portion of the road network located around a vehicle) of several candidate map paths best matches an actual path (as measured by sensors, e.g., GPS, inertial sensors) traveled by the vehicle. According to the multi-resolution trend metric method, the vehicle path and each candidate map path are generalized to a given degree of generalization, thereby yielding an overall trend of the vehicle path and overall trends of each of the candidate map paths. Then, the trend of the vehicle path is compared to the trend of each of the candidate map paths. Based on these comparisons, one or more candidate map paths may be eliminated. If more than one map path remains, the vehicle path and each of the remaining map paths are generalized again, this time to a lesser degree of generalization (thereby allowing more detail into the representations), and comparisons are made between the trend of the vehicle path and the trend of each of the remaining map paths. Based on these comparisons, one or more map paths may be eliminated. These steps are repeated until only a single map path remains. The remaining map path is the path that best approximates the vehicle path and the vehicle is determined to be located on the map path, specifically at the leading end of this map path.

Another application to which the multi-resolution trend metric concept can be applied is evaluation of the accuracy of a geographic database. It is desirable to determine how well a sampled geographic feature follows ground truth. A generalized version of a sampled geographic feature is compared, using the multi-resolution trend metric, to a generalized version of ground truth of the feature to determine how well the generalized versions (i.e., the overall trends) match. This comparison can be a useful metric in comparing relative geometric accuracy. Furthermore, by performing this comparison for varying degrees of generalization, the error between the sampled and ground truth representations of the geographic feature can be determined as a function of resolution.

BRIEF DESCRIPTION OF THE DRAWINGS

FIG. 5 is a diagram that illustrates several different vehicle paths and map paths.

FIG. 6 is a diagram that illustrates a ground truth segment, a sampled map segment, and trends for each.

DETAILED DESCRIPTION OF THE PRESENTLY PREFERRED EMBODIMENTS

I. First Embodiment—iterative Multi-resolution Trend Metric Algorithm for Vehicle Positioning Methods for vehicle positioning use sensor information (e.g., GPS, inertial sensors, etc.) and map data (e.g., from a geographic database that contains data that represents the road network on which the vehicle is traveling) to determine the position relative to the map data at which the vehicle is most likely to be located. This involves comparing a historical vehicular path (derived from the sensor information over some time or distance) to paths along roads in the vicinity of the vehicle that are represented by the map data in order to determine which path on the map is the most likely one. (The paths along roads in the vicinity of the vehicle are referred to collectively as the map path "candidate pool.") The problem of vehicle positioning is thus a problem of comparing path geometries.

Figure 1:
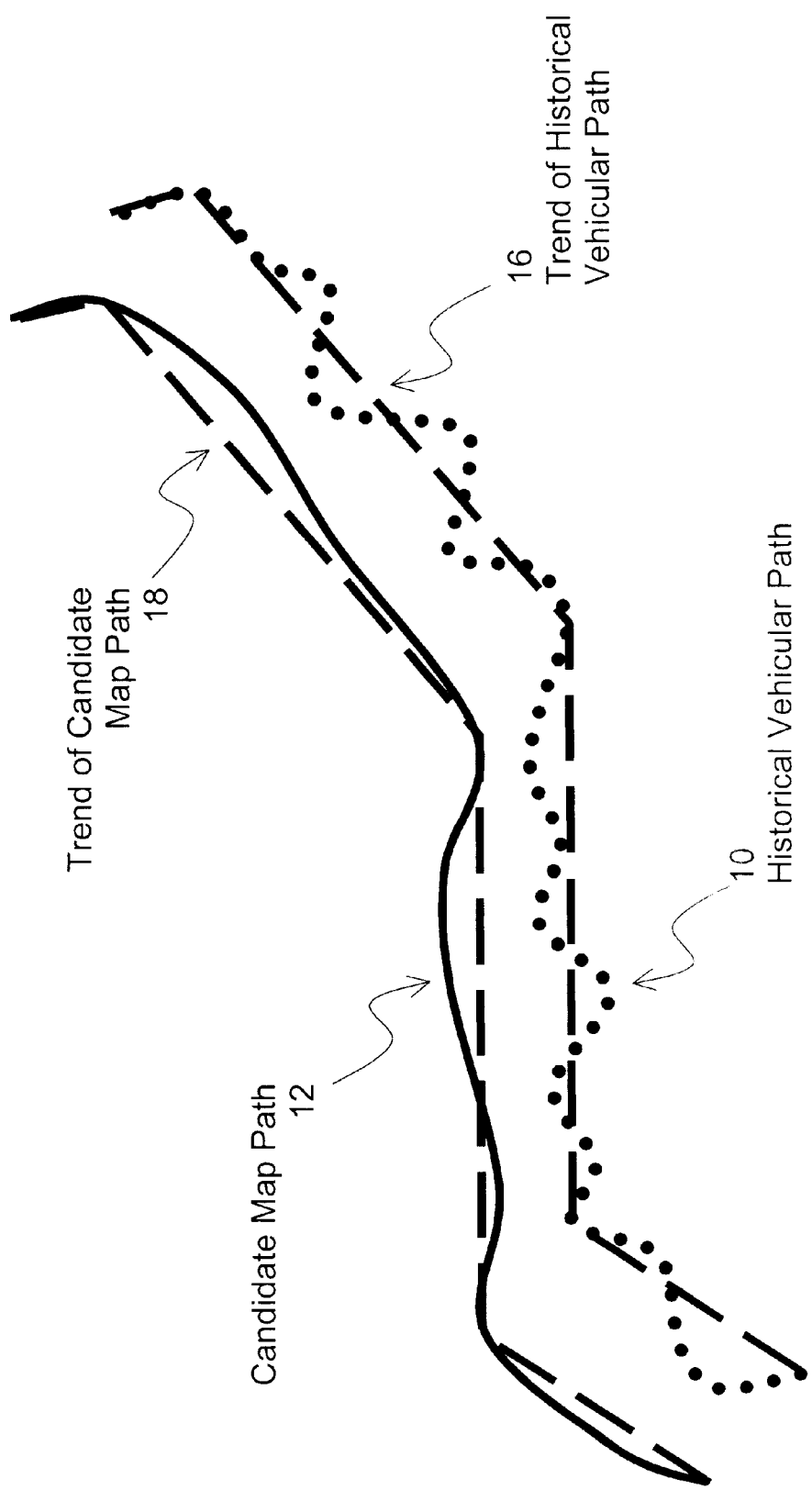
FIG. 1 is a diagram that illustrates a vehicular path, a map path, and trends for each.

This problem can be solved using the disclosed multi-resolution trend metric process. According to a first embodiment of the process, the overall trend of a path can be determined by performing a low pass filtering operation, such as a generalization on the path. FIG. 1 shows a vehicular path 10 (shown by the dotted line) and a candidate map path 12 (shown by the solid line). At first glance, these two paths seem to have very different shapes. However, on closer observation, it can be observed that the map path 12 follows the general trend of the vehicular path 10. Each of these two paths can be generalized (using Douglas-Peucker generalization with the same tolerance, for example) to extract an overall trend. A wider tolerance results in a lower resolution approximation of the original path and a narrower tolerance results in a higher resolution approximation, i.e., the resolution of the generalized path is inversely proportional to the tolerance. The generalized version of the vehicle path 10 is the dashed line labeled 16 and the generalized version of the map path 12 is the dashed line labeled 18. When the vehicle path 10 and the map path 12 are generalized (forming the generalized vehicle path 16 and the generalized map path 18, respectively), it is clear that the overall trends of the two paths are very similar. Thus, by comparing these generalized paths, 16 and 18, it is possible to determine how well the trends of the original paths, 10 and 12, match. (The actual shape comparison of the generalized paths, 16 and 18, can be performed by comparing curvature, by computing the area between the lines, by computing the rotational variation coefficient as described in Ser. No. 09/772,586, filed Jan. 30, 2001, the entire disclosure of which is incorporated by reference herein, or by any other pattern recognition technique.) An advantage of comparing the trends of the two generalized paths is that this comparison is computationally less expensive than comparing the original paths. This is because the generalized paths are less complex than the original paths.

Figure 2:
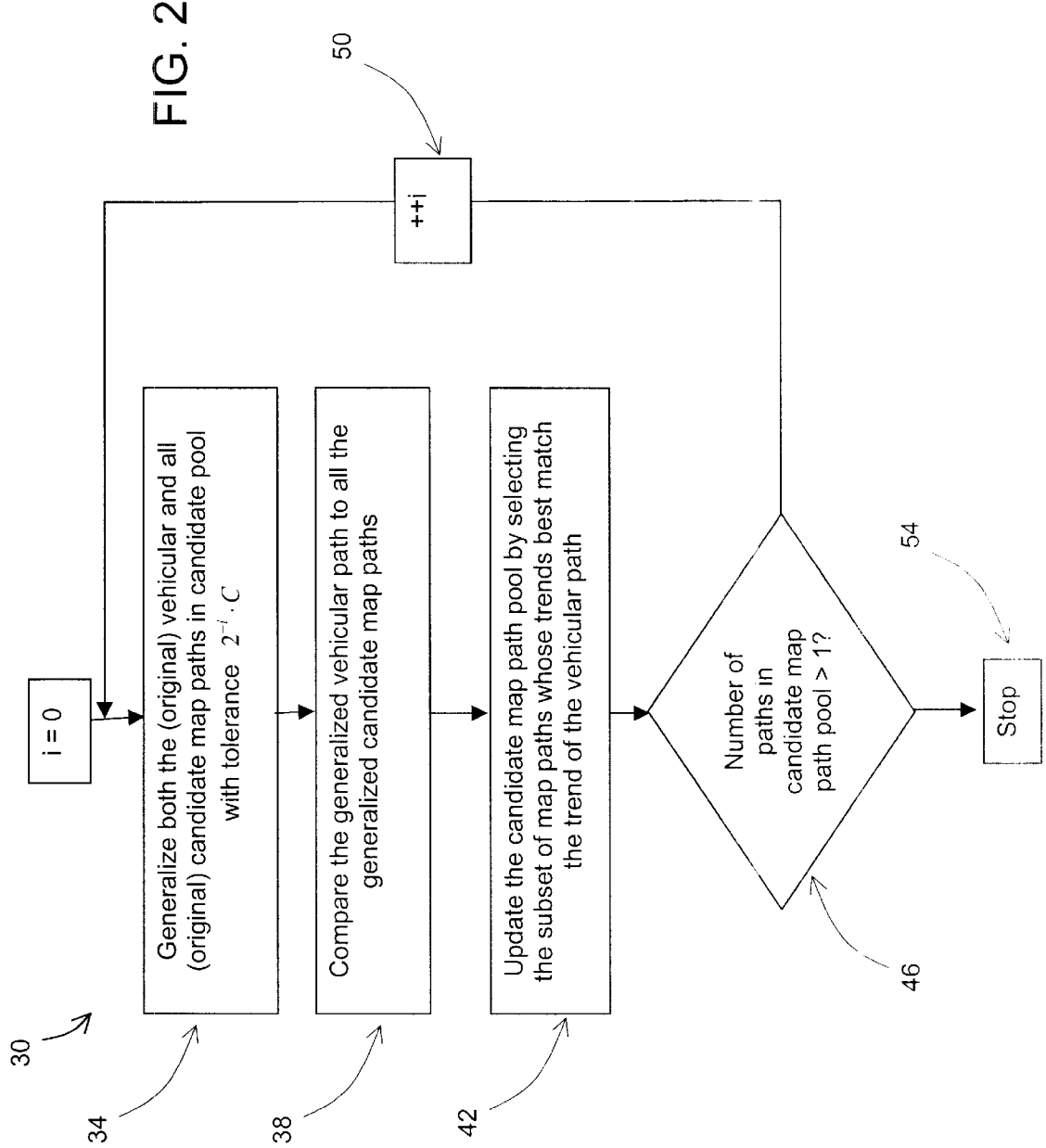
FIG. 2 is a flowchart that illustrates the steps in a process for determining the map path that best matches a vehicular path.

FIG. 2 shows a flowchart of a process 30 for performing vehicle positioning according to the first embodiment. In a first step, both the (original) vehicular path and all (original) candidate map paths in the candidate pool are generalized to within tolerance $2^{-i}.C$ where C is an appropriately chosen constant and i is initialized to 0 (Step 34). After these generalized paths are formed, the generalized vehicular path is compared to each generalized candidate map path (Step 38). Then, the candidate map path pool is updated by selecting the subset of map paths that best match the vehicular path (Step 42).

If the number of map paths in the candidate pool exceeds one (Step 46), the generalization tolerance is decreased (Step 50) and the step of generalization is performed again (Step 34, again). (In this embodiment, the tolerance is decreased by incrementing the value of i by 1, (or equivalently, halving the generalization tolerance.) This time, the (original) vehicular path and the remaining (original) candidate map paths in the candidate pool are generalized to within tolerance $2^{-1}.C$. The generalized vehicular path is compared to each of the generalized candidate map paths (Step 38, again) and the candidate map path pool is updated by selecting the subset of map paths that best match the vehicular path (Step 42, again).

Again, if the number of map paths in the candidate pool exceeds one (Step 46), the generalization tolerance is halved again by incrementing the value of i by 1 (Step 50, again) and the step of generalizing is performed again (Step 34, again). This time, both the (original) vehicular and all (original) candidate map paths in the candidate pool are generalized to within tolerance $2^{-2}.C$.

These steps are repeated until the candidate map path pool contains a single path (Step 46). This single remaining map path is the one on which the vehicle is most likely to be located (Step 54).

Note that at each iteration, the generalization tolerance decreases, i.e., the original path is generalized less at each successive iteration. More detail is allowed into the generalized paths at each iteration.

Figure 3A:
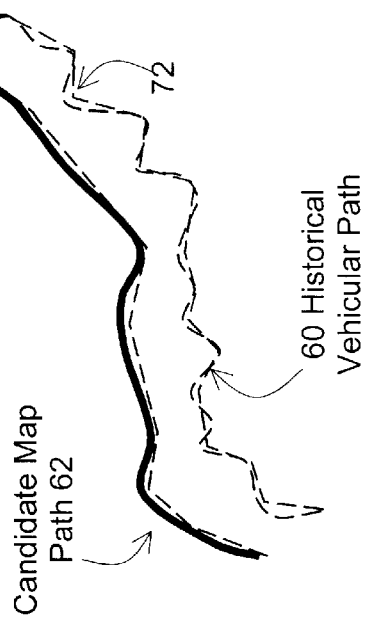
FIGS. 3A, 3B and 3C are diagrams that illustrate a vehicular path, a map path, and trends for the vehicular path and the map path at different levels of generalization.
Figure 3C:
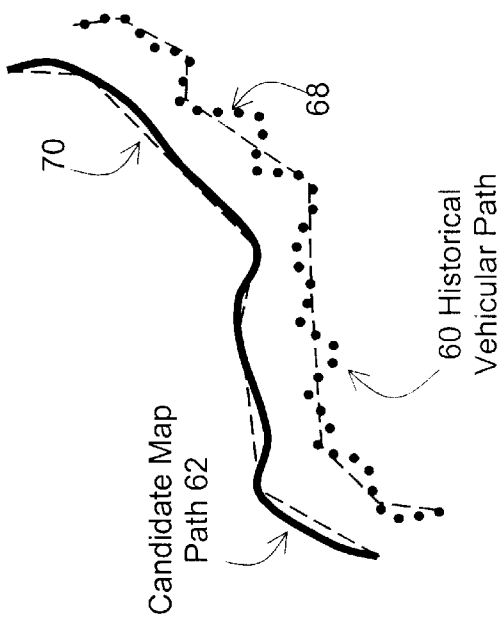
Figure 3B:
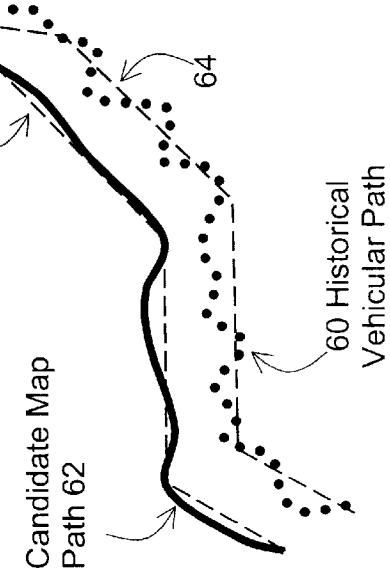

FIGS. 3A, 3B and 3C illustrate how the generalization of a historical vehicle path and a map path changes at different resolutions of the iterative process. FIG. 3A shows a first iteration of the multi-resolution trend metric process. FIG. 3A illustrates a historical vehicle path 60, a map path 62, and their respective generalizations, 64 and 66. In this iteration, the historical vehicle path and the map path are generalized to a low resolution.

FIG. 3B shows a subsequent iteration of the multi-resolution process. FIG. 3B illustrates the historical vehicle path 60, the map path 62, and their respective generalizations, 68 and 70. In this iteration, the generalizations, 68 and 70, have a higher resolution than the paths, 64 and 66, in FIG. 3A.

FIG. 3C shows a still further iteration of the multi-resolution process. FIG. 3C illustrates the historical vehicle path 60, the map path 62, and their respective generalizations, 72 and 74. In the iteration shown in FIG. 3C, the generalizations, 72 and 74, have the highest resolution.

Figure 4A:
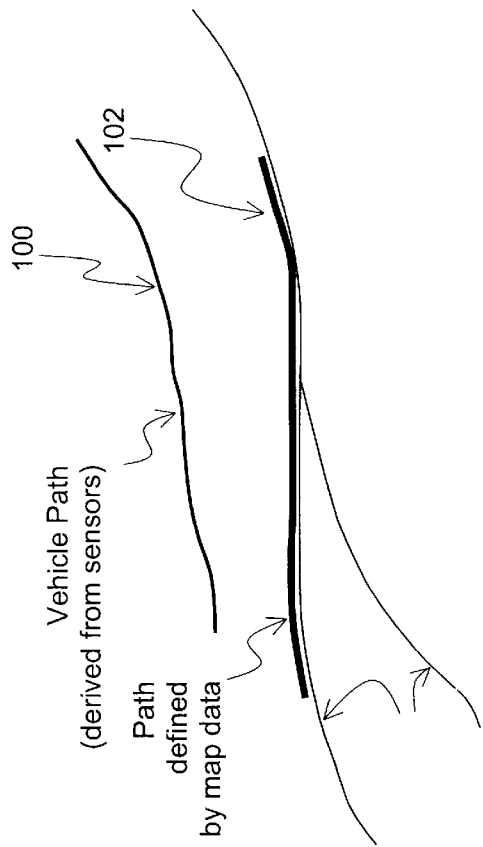
FIGS. 4A and 4B are diagrams that illustrate application of the multi-resolution trend metric process to vehicle positioning.
Figure 4B:
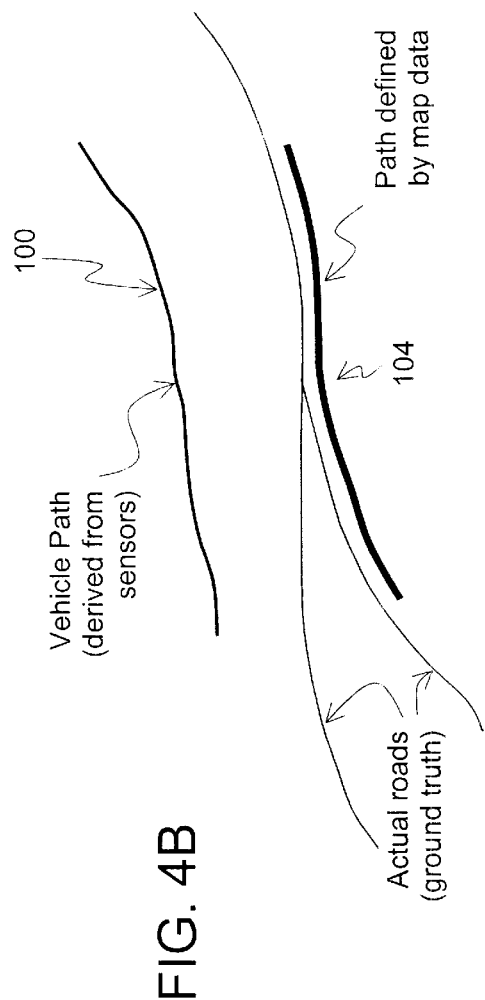

An example illustrating use of the multi-resolution trend metric for vehicle positioning is illustrated in FIGS. 4A and 4B. FIGS. 4A and 4B show a true vehicle path 100 (obtained from dead reckoning and sensor fusion) and several possible paths 102 and 104, defined by data representing the actual road network. Using the multi-resolution trend metric process, the vehicle path and the possible road paths are generalized, first at a low resolution and then at progressively higher resolutions. At each iteration, the generalization of each possible map path is compared to the generalized vehicle path and any generalization of a possible map path that does not match the generalized vehicle path is eliminated until only one generalization of a map path remains.

For purposes of the multi-resolution trend metric process, a vehicle path or a map path can include any continuous length along one or more road segments. A vehicle path or a map path can start any location along a road segment and end at any location along either the same road segment or another road segment. The actual vehicle position is at the leading end of the vehicle path. FIG. 5 illustrate several examples of different vehicle paths and road paths.

The multi-resolution trend metric process for vehicle positioning thus involves comparing the vehicle and map paths at a low resolution (i.e., generalized to a high degree) to determine how well the general trend of each map path matches the vehicular path, removing from the map path pool those paths which are the worst matches to the vehicle path, and then repeating the generalize-compare-discard steps (at successively higher resolutions) until the map path pool contains a single map path. The advantage of performing these steps interatively with gradually increasing resolution is that at the start of the process, when the map path pool is largest, low resolution features, i.e., features with fewer shape points, are compared, thereby resulting in a savings in computational complexity. (For purposes of this specification, a "shape point" refers to a point through which a road segment passes. The locations of shape points along a road segment are used to represent the shape of the road segment.) As the process progresses iteratively, the complexity of the compared features gradually increases, but the map path pool simultaneously gets smaller. This low- to high-resolution comparison may thus result in a significant computational savings and performance improvement compared to the prior approach in which the vehicle path is directly compared to candidate map paths without performing any generalization of the paths.

II. Second Embodiment—application of Multi-resolution Trend Metric to Determination of Relative Accuracy of a Geographic Database The multi-resolution trend metric concept can be applied to evaluating the accuracy of a geographic database. Application of the multi-resolution trend metric concept to evaluating how closely a sampled representation of a geographic feature (e.g., a road segment) matches the actual geographic feature (ground truth) is described in connection with FIG. 6, which is similar to FIG. 1. In FIG. 6, the dotted line 160 represents a ground truth road segment and the solid line 162 represents a sampled road segment.

In comparing the sampled road segment 162 to the ground truth road segment 160, there are several different segment characteristics that can be compared, such as point curvature, length, etc. However, it is also desirable to determine how well the sampled segment follows the overall trend of the corresponding ground truth segment. In other words, a desirable characteristic for a sampled segment is that its overall trend resemble the overall trend of the corresponding ground truth road segment. As described in connection with the process of FIG. 2, the generalized versions of these segments (the two dashed lines 166 and 168, respectively) are compared to determine how well the trends of the two segments match, i.e., how close the sampled segment 162 is to a generalized approximation to the ground truth segment 160. This comparison can be a useful metric in comparing relative geometric accuracy.

Figure 7C:
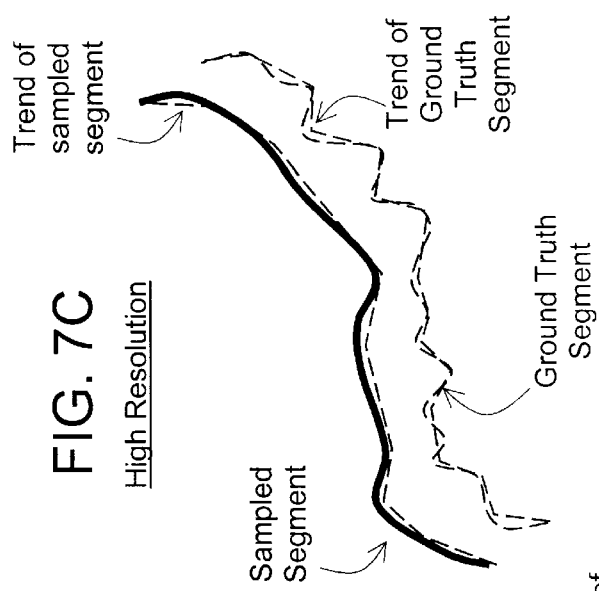
FIGS. 7A, 7B and 7C are diagrams that illustrate ground truth segment, a sampled map segment, and trends for each at different levels of generalization.
Figure 7B:
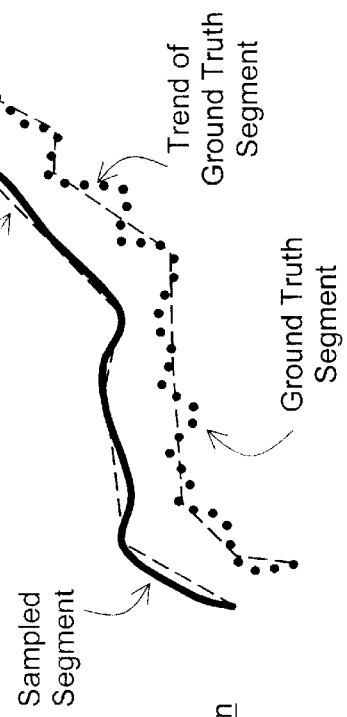
Figure 7A:
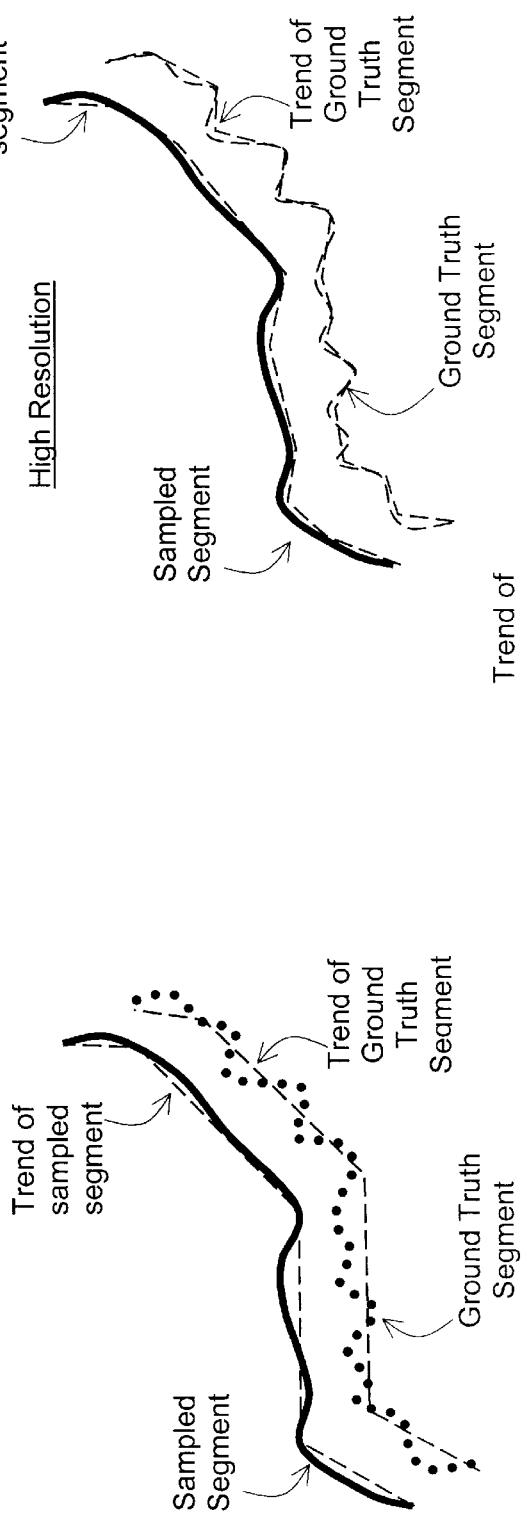

Furthermore, the sampled and ground truth segments can be generalized with progressively narrower tolerances to yield a multi-resolution representation of the sampled and ground truth road segments. By comparing the extracted trends of the sampled and ground truth segments at each resolution, it can be determined how the shape error between the two segments varies as a function of resolution. FIGS. 7A, 7B and 7C illustrate this alternative. In FIG. 7A, a low resolution generalization of the sampled segment is compared to a low resolution generalization of the ground truth segment. In FIG. 7B, a medium resolution generalization of the sampled segment is compared to a medium resolution generalization of the ground truth segment. In FIG. 7C, a high resolution generalization of the sampled segment is compared to a high resolution generalization of the ground truth segment. These comparisons can indicate how well a sampled segment matches ground truth at different resolutions.

It is intended that the foregoing detailed description be regarded as illustrative rather than limiting and that it is understood that the following claims including all equivalents are intended to define the scope of the invention.

I claim:

1. A method for determining a position of a vehicle along a road, the method comprising the steps of:

forming a candidate pool that contains a plurality of candidate map paths, wherein each candidate map path is a data representation of a path along an actual road; and wherein each candidate map path represents a possible path along which the vehicle has traveled; and eliminating all but one of said plurality of candidate map paths from said candidate pool by repeatedly performing the steps of:

generalizing to a given degree of generalization a data representation of an actual vehicle path to form a generalized actual vehicle path;

generalizing to the given degree of generalization each candidate map path in said candidate pool to form a corresponding generalized candidate map path;

comparing each generalized candidate map path in the candidate pool to the generalized actual vehicle path;

eliminating from the candidate pool each generalized map path that does not match the generalized actual vehicle path to a defined degree; and if more than one candidate map path remains in the candidate pool, decreasing the given degree of generalization for greater resolution in the generalized actual vehicle path and the generalized candidate map path.

2. The method of claim 1 wherein said step of comparing is performed by comparing curvature.

3. The method of claim 1 wherein said step of comparing is performed by computing areas between the generalized actual vehicle path and each generalized map path in said candidate pool and then comparing the areas.

4. The method of claim 1 wherein said step of comparing is performed by computing a rotational variation coefficient.

5. The method of claim 1 wherein the step of generalizing is performed using Douglas-Peucker generalization.

6. The method of claim 1 wherein the given degree of generalization to which the data representations of paths are generalized is given by a tolerance $2^{-i}.C$ where C is a constant and wherein i is incremented by 1 each time the given degree of generalization is decreased.

7. A method of comparing a first geometric shape to a plurality of candidate geometric shapes comprising:

forming a candidate pool that contains the plurality of candidate geometric shapes; and eliminating all but one of said plurality of candidate geometric shapes from said candidate pool by repeatedly performing the steps of:

generalizing to a given degree of generalization a data representation of the first geometric shape to form a generalized first geometric shape;

generalizing to the given degree of generalization each candidate geometric shape in said candidate pool to form a corresponding generalized candidate geometric shape;

comparing each generalized candidate geometric shape in the candidate pool to the generalized first geometric shape;

eliminating from the candidate pool each generalized candidate geometric shape that does not match the generalized first geometric shape to a defined degree; and if more than one candidate geometric shape remains in the candidate pool, decreasing the given degree of generalization for greater resolution in the generalized first geometric shape and the generalized candidate geometric shapes.

8. The method of claim 7 wherein the first geometric shape represents a trajectory of a vehicle and the plurality of candidate geometric shapes represent paths along roads in the vicinity of the vehicle, as represented by data in a map database.

9. The method of claim 7 wherein said step of comparing is performed by comparing curvature.

10. The method of claim 7 wherein said step of comparing is performed by computing areas between the generalized first geometric shape and each generalized candidate geometric shape in said candidate pool and then comparing the areas.

11. The method of claim 7 wherein said step of comparing is performed by computing a rotational variation coefficient.

12. The method of claim 7 wherein the step of generalizing is performed using Douglas-Peucker generalization.

13. The method of claim 7 wherein the given degree of generalization to which the data representations of paths are generalized is given by a tolerance $2^{-i}.C$ where C is a constant and wherein i is incremented by 1 each time the given degree of generalization is decreased.

14. A method of evaluating the accuracy of a sampled data representation of a geographic feature with respect to a ground truth representation of the geographic feature, the method comprising:

generalizing to a given degree of generalization the data representation of the geographic feature to form a generalized data representation of the geographic feature;

generalizing to the given degree of generalization the ground truth representation of the geographic feature to form a corresponding generalized ground truth representation of the geographic feature;

comparing the generalized ground truth representation of the geographic feature to the generalized data representation of the geographic feature; and using a result of the comparison as a metric indicative of how well the data representation of the geographic feature matches the ground truth representation of the geographic feature.

15. The method of claim 14 wherein the geographic feature is a road segment.

16. The method of claim 14 wherein said step of comparing is performed by comparing curvature.

17. The method of claim 14 wherein said step of comparing is performed by computing areas between the generalized data representation of the geographic feature and the generalized ground truth representation of the geographic feature and then comparing the areas.

18. The method of claim 14 wherein said step of comparing is performed by computing a rotational variation coefficient.

19. The method of claim 14 wherein the step of generalizing is performed using Douglas-Peucker generalization.

20. The method of claim 14 wherein the data representation of the geographic feature and the ground truth representation of the geographic feature are generalized to several different degrees of generalization and comparisons are made between the generalization of the data representation of the geographic feature and the generalization of the ground truth representation of the geographic feature at each of these different levels of generalization.

21. A method of comparing a first geometric shape to a plurality of candidate geometric shapes comprising:

forming a candidate pool that contains the plurality of candidate geometric shapes; and eliminating all but one of said plurality of candidate geometric shapes from said candidate pool by repeatedly performing the steps of:

reducing to a given degree of generalization a data representation of the first geometric shape to form a generalized first geometric shape illustrating trends in the first geometric shape;

reducing to the given degree of generalization each candidate geometric shape in said candidate pool to form a corresponding generalized candidate geometric shape illustrating trends in the candidate geometric shape;

comparing each generalized candidate geometric shape in the candidate pool to the generalized first geometric shape;

eliminating from the candidate pool each generalized candidate geometric shape that does not match the generalized first geometric shape to a defined degree; and if more than one candidate geometric shape remains in the candidate pool, decreasing the given degree of generalization for greater resolution in the generalized first geometric shape and the generalized candidate geometric shapes.

* * * * *